Jan. 30, 1951　　　A. SMITH ET AL　　　2,539,934
MOWING MACHINE

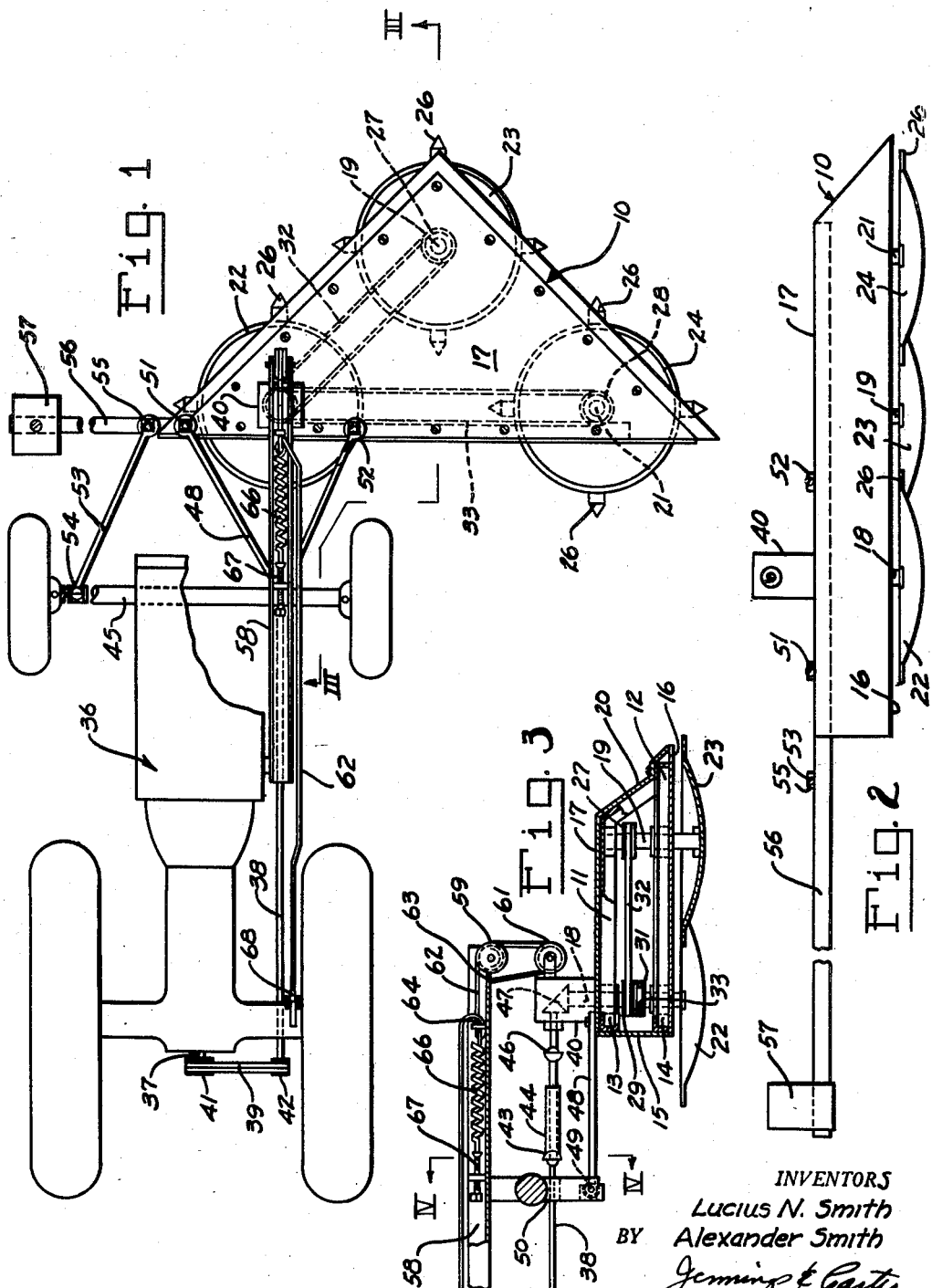

Filed Feb. 27, 1948　　　　　　　　3 Sheets-Sheet 2

INVENTORS
Lucius N. Smith
BY　Alexander Smith

Jennings & Carter
Attorneys

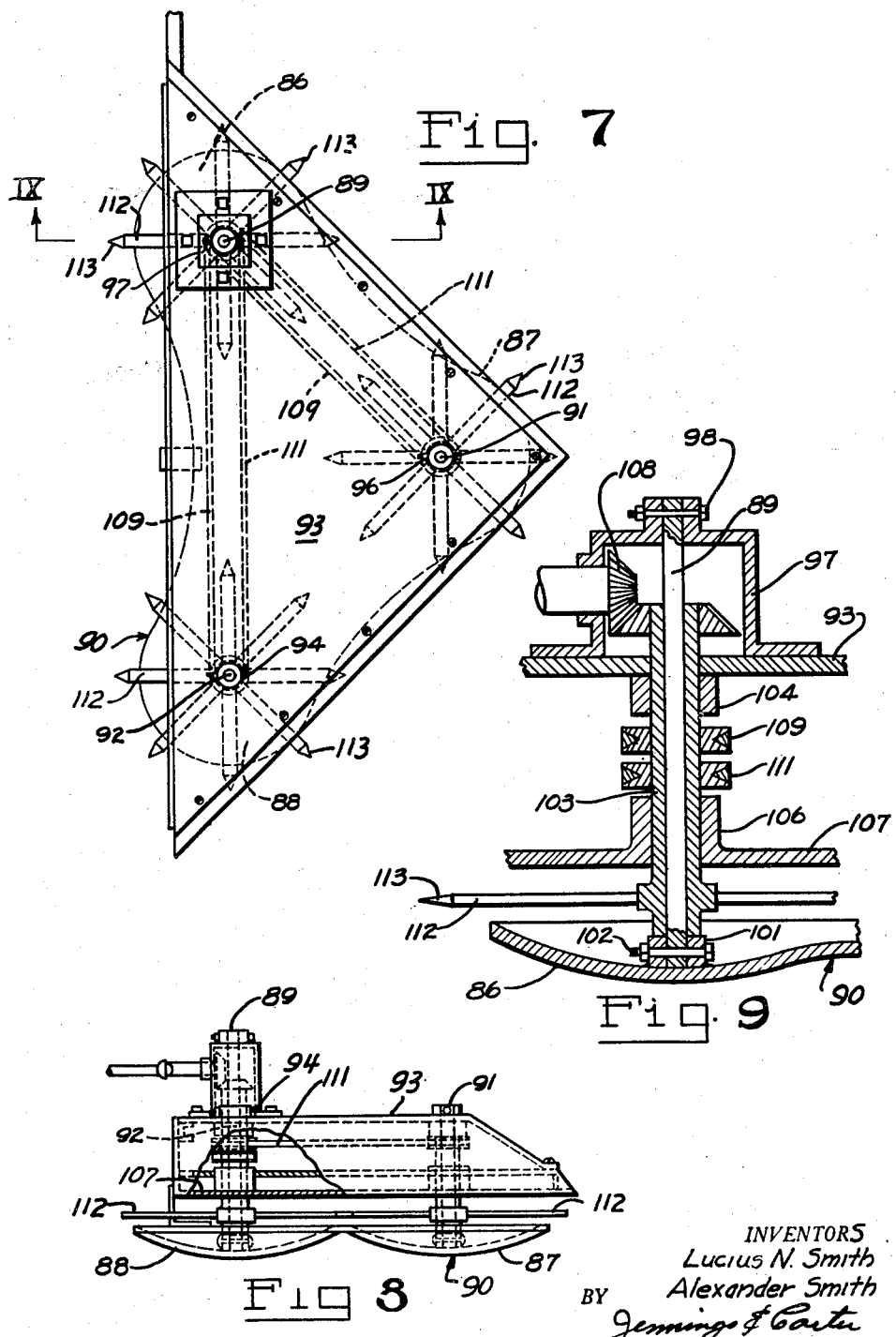

Patented Jan. 30, 1951

2,539,934

UNITED STATES PATENT OFFICE 2,539,934

MOWING MACHINE

Alexander Smith and Lucius N. Smith,
Montverde, Fla.

Application February 27, 1948, Serial No. 11,698

5 Claims. (Cl. 56—25.4)

Our invention relates to mowing machines and in particular contemplates a mowing machine adapted to move over uneven ground such as along the sides of highways, in pastures, orchards, groves, and the like.

One of the objects of our invention is to provide a mowing machine which shall be capable of close mowing around trees and under low hanging branches, as in orange groves, and in which the cutting elements are maintained at a uniform distance above the ground.

A further object of our invention is to provide a mowing machine embodying an upwardly dished disk disposed to slide along the ground when in operation, together with rotary cutting elements, rotating about a vertical axis a fixed distance above the point of contact of the disk with the ground. The disk may be mounted to rotate with the cutting elements attached thereto or the cutting elements may be mounted separately from the disk. A plurality of disks with associated cutting elements may be and preferably are employed.

In a still further aspect of our invention, there is contemplated a machine which combines the functions of mowing and cultivating the ground simultaneously. This result is accomplished by means of upwardly dished rotary disks disposed to slide along the ground with cutting elements carried by and extending outwardly around the disks, and with cultivating members depending from the disks in position to engage and stir the surface of the ground as the disks move over it.

Still another feature of our invention resides in the manner in which the disks and cutting elements are mounted and supported whereby they move over the ground with a minimum of friction while maintaining contact with the ground.

Briefly, our invention embodies a triangular frame, mounted for vertical and angular movement at the front of a farm tractor. Mounted on the under side of the frame, to slide along the ground, are a plurality of upwardly dished disks. In the preferred embodiment of our invention the disks are mounted for rotary motion about vertical axes and are provided with cutting elements extending radially outward therefrom which engage and cut the vegetation. Means are provided for yieldably supporting the major portion of the weight of the apparatus from the tractor whereby the friction of movement of the disks over the ground is reduced to a minimum. The frame is laterally offset with respect to the tractor frame which permits the apparatus to be used under the low hanging branches of trees without damage to the trees or to the fruit.

Apparatus embodying features of our invention is illustrated in the accompanying drawings forming a part of this application, in which—

Fig. 1 is a plan view of the apparatus mounted for operation by a farm tractor;

Fig. 2 is an enlarged rear elevational view of the mower removed from the machine, the rods for connecting the same to the tractor being in section;

Fig. 3 is a sectional view taken generally along the line III—III of Fig. 1;

Fig. 7 is a plan view of a modified form of our invention;

Fig. 8 is a side elevation of the apparatus shown in Fig. 7; and,

Fig. 9 is an enlarged detail sectional view taken along the line IX—IX of Fig. 7.

Figure 5:
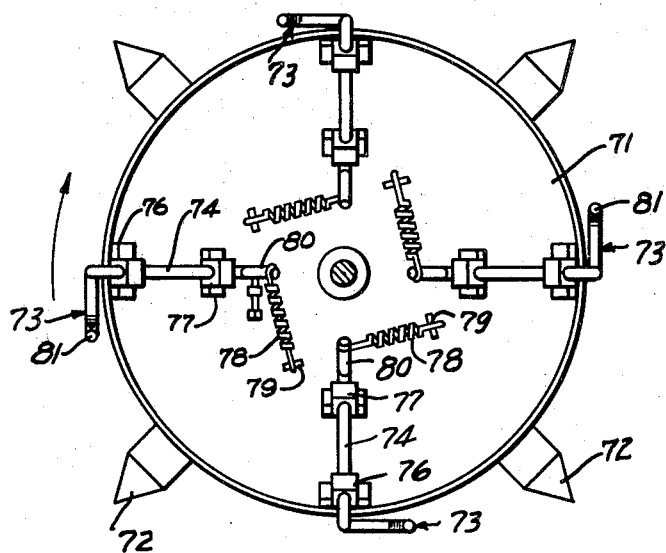
Fig. 5 is an enlarged plan view of a modified form of our invention showing a disk having both cutting elements and cultivating elements mounted thereon.

Referring now to the drawings for a better understanding of our invention, our improved mower comprises a triangular frame 10 constructed with upper and lower frame members 11 and 12, and vertically spaced base members 13 and 14. Welded to the under side of the lower frame members is a plate 16 and removably secured to the upper frame members is a plate 17. The frame is enclosed at the rear by a plate 18 and in front by a plate 20. Mounted in the frame and extending downwardly through the lower plate 16 are a trio of shafts 18, 19 and 21, suitable bearings being carried by the frame members in which the shafts rotate. Mounted on the lower ends of the shafts 18, 19 and 21 are a trio of upwardly dished circular disks 22, 23 and 24, respectively. As shown in Fig. 1 of the drawing, the shafts 18, 19 and 21 are near the corners of the triangular frame. The disks 22, 23 and 24 are mounted to slide on the ground as the machine moves over the ground and thus support the frame. They are of such diameter that the sum of their diameters exceeds the width of the triangular frame of the mower. Mounted on each of the disks and extending radially outwardly therefrom are a plurality of cutting members 26 which engage and cut the vegetation as the machine is propelled over the ground. The shafts 19 and 21 are each provided with pulleys 27 and 28, respectively and the shaft 18 is provided with two pulleys 29 and 31 with belts 32 and 33 connecting these pulleys with the pulleys 27 and 28 to drive all the shafts in unison.

Power for propelling and operating the machine is derived from a farm tractor 36 with the usual power takeoff 37. Extending forwardly from the rear of the tractor 36 is a shaft 38 which is driven from the power take off 37 through a belt 39 and pulleys 41 and 42. The shaft 38 drives the shaft 18 of the mowing machine through a universal connection 43, a spline connection 44, a second universal connection 46, and a gear box 40 with a gear train 47.

As above noted, the frame of the machine is laterally offset with respect to the tractor 36. A V-shaped link 48 is mounted with its vertex in a ball and socket joint 49 carried by a stirrup 50 secured to the axle 45, the joint being directly under the shaft 38. The ball and socket joint forms a universal joint connection in the manner understood. The forwardly extending arms of the link are loosely pivoted at 51 and 52 to the base of the triangular frame of the mower. A second link 53 is connected to the front axle 45 of the tractor by means of a ball and socket joint 54, forming a universal joint connection and is loosely pivoted to the base frame of the mowing machine at 55. A counter weight arm 56 extends laterally outward from the corner of the mower frame, adjacent the shaft 18, and has mounted on the outer end thereof a counter weight 57. This counter weight serves to counterbalance in part the laterally offset portion of the machine.

Mounted on the tractor and extending forwardly over the front axle 45 is a boom 58. At the front end of the boom, over the gear box 40 is a pulley 59 and mounted on the gear box is a pulley 61. A cable 62 is connected at 63 to the boom and passes down under the pulley 61 and over the pulley 59 and thence rearwardly where it is connected at 64 to a spring 66 mounted on the boom 58. The tension on the spring 66 is adjusted by means of a bolt 67 so that the major portion of the weight of the machine is sustained by the spring 66. In practice the spring 66 is adjusted to a point where the disks 22, 23 and 24 slide over the ground in operation with a minimum of friction. The cable 62 continues rearwardly and is connected at its rear end to a lever 68 by means of which the machine may be lifted entirely off the ground, taking the tension off the spring 66.

Figure 6:
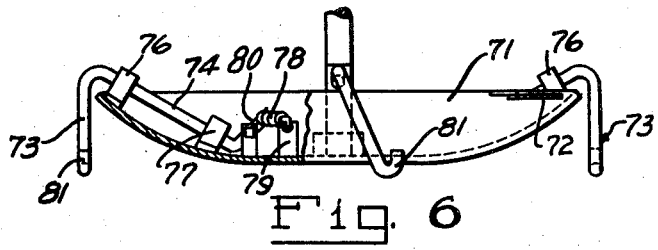
Fig. 6 is a side view, partly in section, of the disk shown in Fig. 5.
Figure 4:
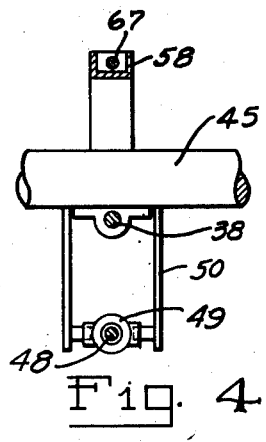
Fig. 4 is an enlarged detail sectional view taken along the line IV—IV of Fig. 3.

In Figs. 5 and 6 of the drawing, we show a modified form of disk 71. The disk 71 is provided with a plurality of cutting elements 72, as previously described, and in addition thereto is provided with a plurality of earth cultivating members 73 which depend from the disk and engage the surface of the ground to work it as the mowing machine is propelled over the ground with the disk rotating. The cultivating elements 73, as shown in the drawing, are bent over the edge of the disk and include a rocker shaft 74 mounted in bearings 76 and 77 carried by the disk. The inner ends of the rocker shafts 74 are turned upwardly, as shown at 80, and each is connected to a spring 78, anchored at 79, which biases the lower end of the cultivating member into contact with the ground. The springs also serve to yield in event the cultivating members strike a stone or other hard material in the ground. We have found the cultivating elements do not need to be sharpened but may be provided with turned up ends as shown at 81. The forward movement of the mowing machine coupled with a rotary motion of the disks causes the members to engage and cultivate the surface of the ground, especially in loose sandy soil.

In Figs. 7, 8 and 9 we show a modified form of our invention, in which upwardly dished disks 86, 87 and 88 are formed in a single sheet of metal 90 and are connected to the frame of the machine by means of stationary shafts 89, 91 and 92 secured to the upper plate 93 of the machine by means of bolts 94 and 96. The shaft 89 is connected to the upper plate 93 through the gear box 97 and bolt 98. The lower ends of the shaft are connected to the disks, as shown in Fig. 9, by means of collars 101 welded to the disks and bolts 102 passing through the lower ends of the shaft and the collars.

Surrounding each of the shafts is a rotary sleeve 103 which is mounted in suitable bearings 104 and 106 carrier respectively by the upper plate 93 and the lower plate 107 of the machine. The rotary sleeve 103 surrounding the shaft 89 is driven from the power take off of the tractor through a gear train 108 and drives the other two rotary sleeve through belts 109 and 111.

Mounted on each of the rotary sleeves 103 just above the edges of the disks 86, 87 and 88 are a plurality of radially extending arms 112 which carry, on their outer ends, cutting elements 113 which extend outwardly beyond the peripheries of their associated disks. It will be seen that the distinguishing feature of this modification of our invention is that the supporting disks are made stationary with the cutting elements mounted to rotate above the disks, whereas in the previous modification, the disks were made to rotate with the cutting elements mounted directly on the disks. In all other respects, the two modifications are similar.

From the foregoing description, the operation of our improved mowing machine will be readily understood. With the machine mounted as shown in Figs. 1 and 3 of the drawing, and with the disks 22, 23 and 24 resting upon the ground, and with the major portion of the weight of the machine sustained by the spring 66, the machine is pushed forwardly over the ground, while the disks are rapidly rotated by the means described, from the power take-off 37 of the tractor. The ball and socket connections of the links 48 and 53 and the loose pivotal connections 51, 52 and 53 allow the machine to adapt itself to inequalities in the surface of the ground which is very important in mowing pastures, groves, and along roadways. The mounting of the cutting elements 26 on the upwardly dished disks insures that the vegetation will be cut at a uniform distance above the ground and regardless of the inequalities of the ground. We have found that with our improved mower, we are able to cut not only ordinary vegetation such as grass and weeds but that light brush and sprouts are readily cut. As the vegetation is cut, a great deal of it is thrown inwardly of the cutting elements, or disks, and is again subjected to the action of the cutting elements so that it is cut up in short pieces and deposited on the ground in the form of a mulch which is very important in maintaining the fertility of the soil and in preventing erosion.

We have further found, that the cultivating elements 73 are very effective, especially in the tilling of citrus fruit groves. These elements stir the soil and uproot the small vegetation encountered, while the cutting elements 72 mow the vegetation as herein previously described.

We have furthermore found that cutting elements, mounted, as shown and described in Figs. 7, 8 and 9 of the drawings, above stationary, upwardly dished disks, are as effective in cutting the vegetation as if mounted directly on the disks and with the disks sliding on the ground.

From the foregoing, it will be apparent that we have devised an improved mowing machine which is simple and sturdy of construction, is especially effective in operating over rough, uneven ground, and which contains a minimum of parts liable to get out of order. All of the moving parts of the apparatus are enclosed, except the actual cutting disks, so that dirt, grit, and other foreign matter cannot get into the bearings or belts, thus insuring long life of the apparatus.

While we have shown our invention in but two forms, it will be obvious to those skilled in the art that it is not so limited, but is susceptible of various other changes and modifications, without departing from the spirit thereof, and we desire, therefore, that only such limitations shall be placed thereupon as are specifically set forth in the appended claims.

What we claim is:

1. In a mowing machine, a triangular frame, a trio of horizontally disposed upwardly dished laterally spaced disks mounted under the frame near the corners thereof and disposed to slide along the ground and support the frame, means near each corner of the frame supporting the disks for rotation about their vertical axes, cutting members carried by and extending outwardly from the disks, power actuated means operatively connected to the disks for rotating the same about their vertical axes and for propelling the machine over the ground, links flexibly connecting the front of the power actuated means and the base of the triangular frame near a corner of the frame, a spring suspension for sustaining the weight of the machine in part from the power actuated means, and a counterweight connected to the frame at a point laterally removed from the suspension point thereof and operable to counterbalance in part the overhanging weight of the machine.

2. In a translatably movable mowing machine, a frame triangular in shape as viewed in plan, upwardly dished horizontally disposed disks mounted for rotation on the frame near each corner thereof, said disks being constructed and arranged to slide along the ground and support the machine and being of a diameter for the peripheries thereof to overlap in the direction of translatory movement of the machine, drive means operatively connected to the disks for rotating the same, and cutting elements on the peripheries of the disks.

3. A mowing machine as defined in claim 2 in which the frame is connected for translatory movement at one side to a vehicle with one apex of the triangular frame forming the front thereof.

4. In combination with a self propelled vehicle having a frame, a mowing machine embodying a frame triangular in shape as viewed in plan, horizontally disposed disks mounted for rotation on the frame near each corner thereof, said disks being disposed to slide along the ground and support at least a part of the weight of the mowing machine, cutters on the peripheries of the disks, a boom carried by the vehicle and extending forwardly of the front end of the vehicle and overlying a side of the mowing machine frame, a pair of links secured fixedly at one end to said side of the mowing machine frame adjacent a corner thereof, a universal joint connection securing the other ends of said links to the vehicle frame, a tension spring anchored at one end to said boom, a cable connected at either end to the opposite end of said spring and to said side of the triangular frame at a point between the links, a counterweight secured to the corner of the frame outwardly at the point of connection thereto of said cable and of a mass to partially counterbalance the weight of the mowing machine suspended from said cable, and drive means operatively connected to the disks for rotating the same.

5. Apparatus as defined in claim 4 in which the means to rotate the disks includes a flexible drive shaft leading from a source of power on the vehicle and operatively connected to the disks.

ALEXANDER SMITH.
LUCIUS N. SMITH.

REFERENCES CITED

The following references are of record in the file of this patent:

UNITED STATES PATENTS

| Number | Name | Date |
|---|---|---|
| 119,398 | Payne | Sept. 26, 1871 |
| 1,294,346 | Owens | Feb. 11, 1919 |
| 1,397,365 | Cook | Nov. 15, 1921 |
| 1,533,701 | Evanuk | Apr. 14, 1925 |
| 1,710,749 | Svendsgaard | Apr. 30, 1929 |
| 1,745,069 | Wallace et al. | Jan. 28, 1930 |
| 2,193,712 | Campbell | Mar. 12, 1940 |
| 2,197,561 | Orr | Apr. 16, 1940 |
| 2,263,431 | White | Nov. 18, 1941 |
| 2,344,663 | Wood | Mar. 21, 1944 |

FOREIGN PATENTS

| Number | Country | Date |
|---|---|---|
| 339,618 | Great Britain | 1930 |
| 416,140 | Great Britain | 1934 |